United States Patent
Chen

[11] Patent Number: 5,110,150
[45] Date of Patent: May 5, 1992

[54] COLLAPSIBLE MECHANISM FOR A STROLLER

[76] Inventor: Shun-Min Chen, P.O. Box 82-144, Taipei, Taiwan

[21] Appl. No.: 689,542

[22] Filed: Apr. 23, 1991

[51] Int. Cl.$^5$ .............................................. B62B 7/06
[52] U.S. Cl. .................................. 280/642; 280/650; 280/47.38; 297/46; 403/93
[58] Field of Search ............... 280/641, 642, 647, 650, 280/47.38, 47.4; 297/42, 44, 46; 403/92, 93

[56] References Cited

U.S. PATENT DOCUMENTS

| | | | |
|---|---|---|---|
| 3,421,774 | 1/1969 | Patterson | 380/642 |
| 4,019,757 | 4/1977 | Beger et al. | 280/649 |
| 4,741,551 | 5/1988 | Perego | 280/642 |
| 4,828,278 | 5/1989 | Nakao et al. | 380/644 |
| 4,848,787 | 7/1989 | Kassai | 280/642 |

Primary Examiner—Andres Kashnikow
Assistant Examiner—Michael Mar
Attorney, Agent, or Firm—Alfred Lei

[57] ABSTRACT

This invention relates to a collapsible mechanism for a stroller and in particular to one which includes an engaging seat formed with a longitudinal passage for slidably receiving the rear wheel support and two opposite lugs and a recess at a top thereof, a coupling block connected at one end with the handle support and having at the other end an angular portion adapted to receive the rear wheel support and be received in the recess of the engaging seat, a spring disposed within the semi-cylindrical chamber of the engaging seat, a stop member engaged with the rear wheel support and enclosed by the engaging seat and in contact at a top end with a bottom end of the spring end of the spring, and a crank arm pivoted on the rear wheel support at one end and on the handle support at the other.

1 Claim, 7 Drawing Sheets

COLLAPSIBLE MECHANISM FOR A STROLLER

BACKGROUND OF THE INVENTION

It is found that the prior art stroller is often expanded or collapsed thereby hurting the baby therein. As illustrated in FIG. 9, the collapsible mechanism of such stroller comprises a front wheel support 91, a rear wheel support 92, a backrest support 93, a handle support 94 and seat rods 95 and 96. The handle support 94 is pivotally connected with the backrest support 93. The backrest support 93 is provided with a hook member 97 which is controlled by a press rod 98. When desired to collapse the stroller, it is only necessary to press the press rod 98 to detach the hook member 97 from a protuberance 99. However, since the press rod 98 is arranged at both sides, it is easily pressed by the children inadvertently or deliberately thereby hurting the baby therein.

Therefore, it is an object of the present invention to provide a collapsible mechanism of a stroller which may obviate and mitigate the above-mentioned drawbacks.

SUMMARY OF THE INVENTION

This invention relates to a collapsible mechanism for a stroller.

It is the primary object of the present invention to provide a collapsible mechanism for a stroller which will not be expanded or collapsed inadvertently.

It is another object of the present invention to provide a collapsible mechanism for a stroller which may ensure the safety of the baby sitting therein.

It is still another object of the present invention to provide collapsible mechanism for a stroller which is simple in construction.

It is still another object of the present invention to provide collapsible mechanism for a stroller which is easy to operate.

It is a further object of the present invention to provide a collapsible mechanism for a stroller which economic to produce.

Other objects and merits and a fuller understanding of the present invention will be obtained by those having ordinary skill in the art when the following detailed description of the preferred embodiment is read is conjunction with the accompanying drawings.

DETAILED DESCRIPTION OF THE PREFERRED EMBODIMENT

Figures 1, 2:
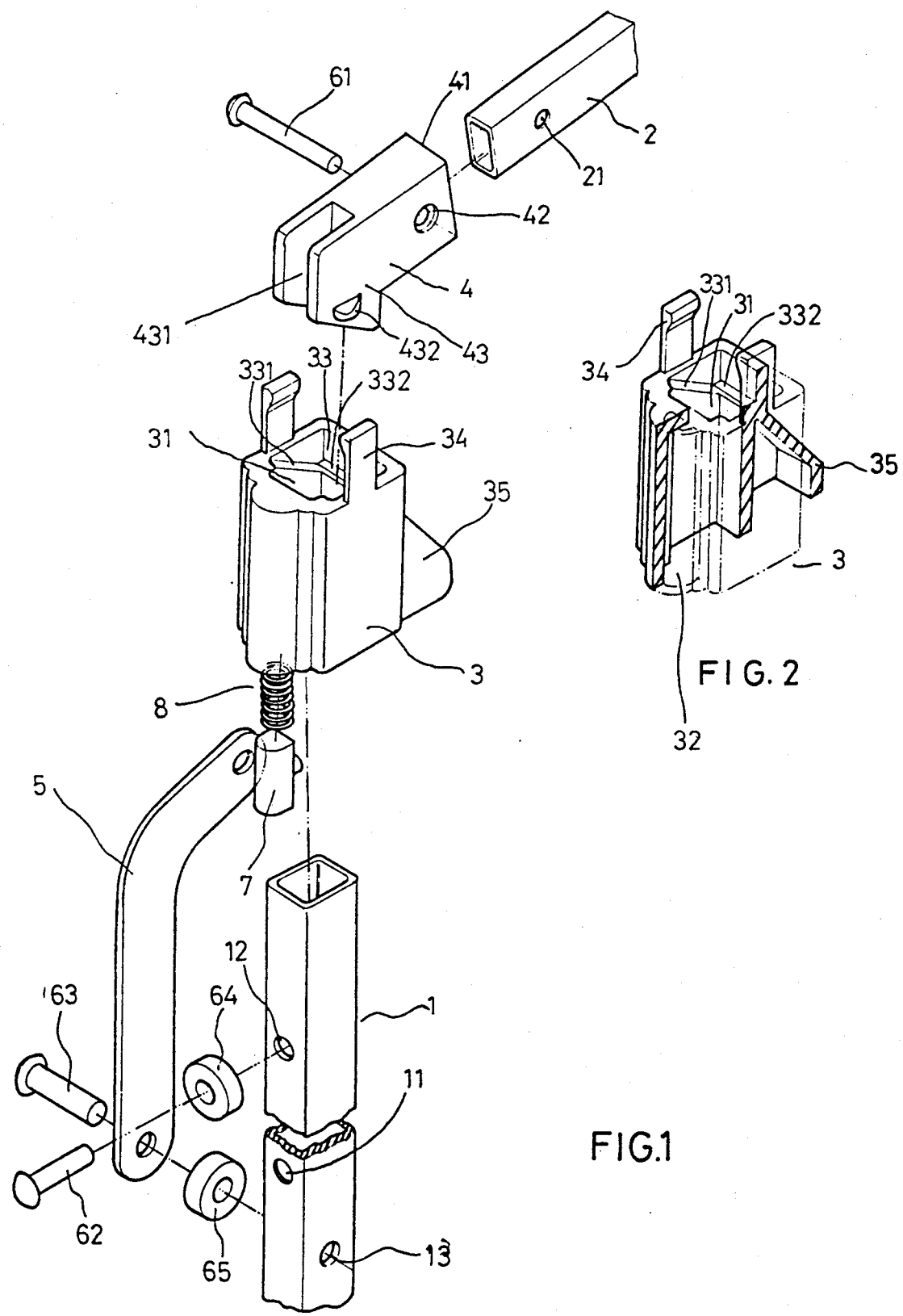
FIG. 1 is an exploded view of a collapsible mechanism for a stroller according to the present invention.
FIG. 2 is a sectional view of the engaging seat.

With reference to the drawings and in particular to FIG. 1 thereof, the collapsible mechanism for a stroller according to the present invention is symmetric in both side portions and so only one side portion thereof will be described in the specification. The side portion of the collapsible mechanism for a stroller mainly comprises a rear wheel support 1, a handle support 2, an engaging seat 3, a coupling block 4, and a crank arm 5. The engaging seat 3 is formed with a longitudinal passage 31 having a semi-cylindrical chamber 32 at one side thereof. On the top of the engaging seat 3 there are two opposite lugs 34 and a recess 33 with two inclining shoulders 331 and a horizontal shoulder 332. Further, the engaging seat 3 is provided with a tongue 35 at one side.

The coupling block 4 has a connecting end 41 adapted to receive the handle support 2 which is fixedly joined to the connecting end 41 by a rivet 61 extending through the hole 42 of the connecting end 41 and the hole 21 of the handle support 2. The other end 43 of the coupling block 4 has a slot 431 adapted to receive the rear wheel support 1 and a protuberance 432 at both sides.

A stop member 7 is engaged with a hole 11 of the rear wheel support 1. A spring 8 is inserted into the chamber 32 of the engaging seat 3. The engaging seat 3 is then slid down on the rear wheel support 1, enclosing the stop member 7. A rivet 62 extends through a washer 64 and a hole 12 of the rear wheel support 1 thereby keeping the engaging seat 3 in a fixed position.

The crank arm 5 is connected at the upper end with the hole 42 of the coupling block 4 by the rivet 61 and at the lower end with the hole 13 of the rear wheel support 1 by the rivet 63 and the washer 65.

Figure 3:
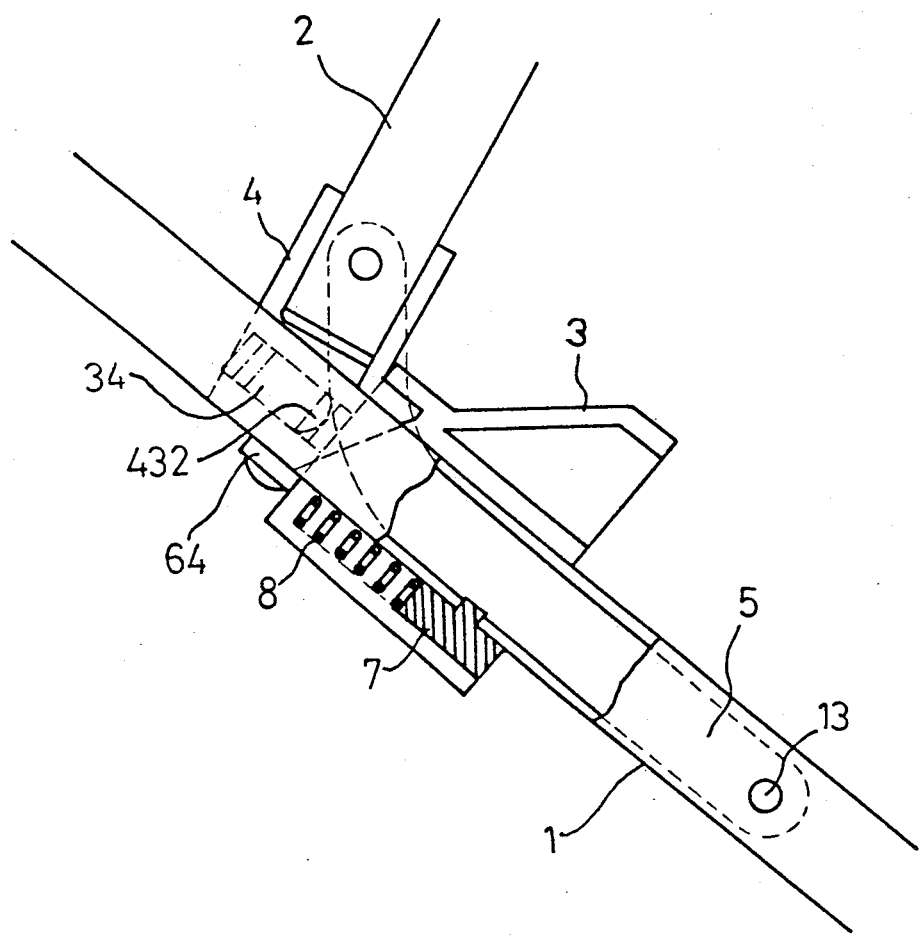
FIG. 3 shows the assembly of the present invention.

In assembly, the coupling block 4 is mounted on the end of the handle support 2. The engaging seat 3 is put on to an appropriate position of the rear wheel support 1. Hence, the coupling block 4 may swivel about the rivet 63 by means of the crank arm 5. When the spring 8 in the engaging seat 3 is not in compressed condition, the slot 431 of the coupling block 4 encloses the rear wheel support 1 with the angular portion 43 of the coupling block 4 received in the recess 33 of the engaging seat 3, as shown in FIG. 3.

Figures 4, 5:
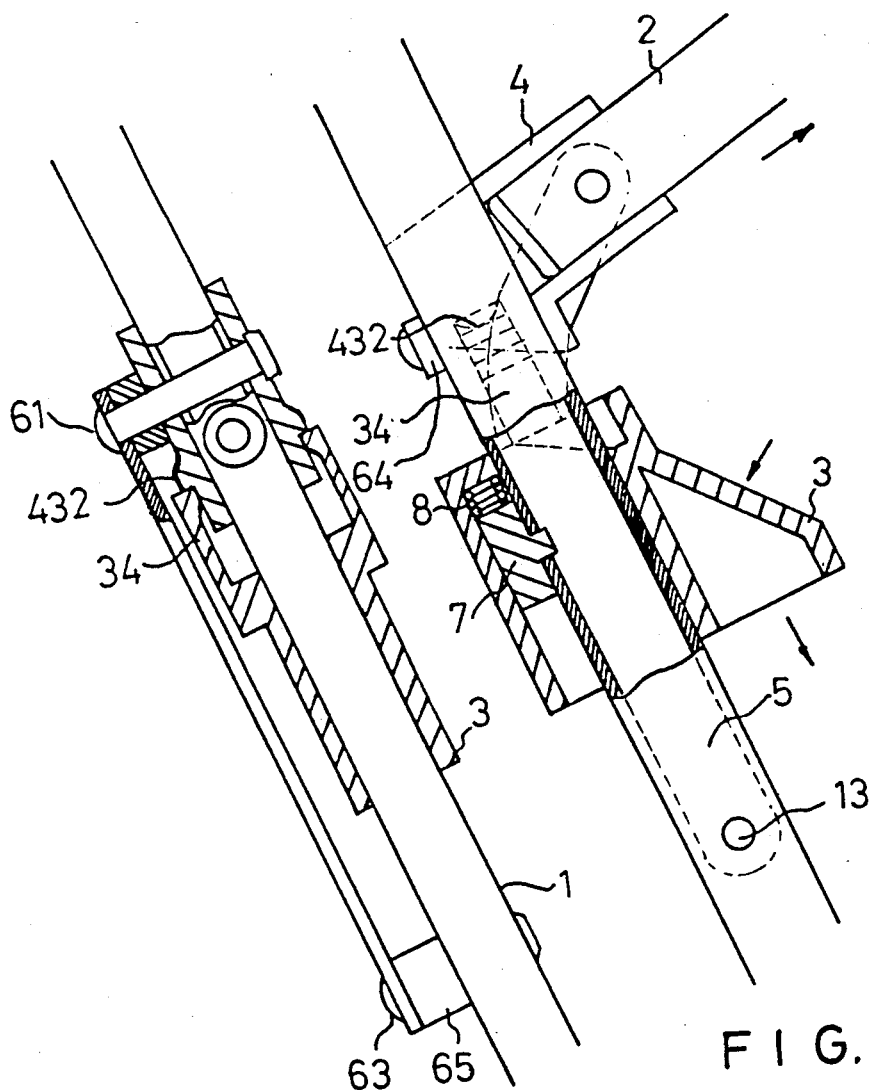
FIG. 4 shows the principle of the present invention.
FIG. 5 is a sectional side view of FIG. 4.
Figure 6:
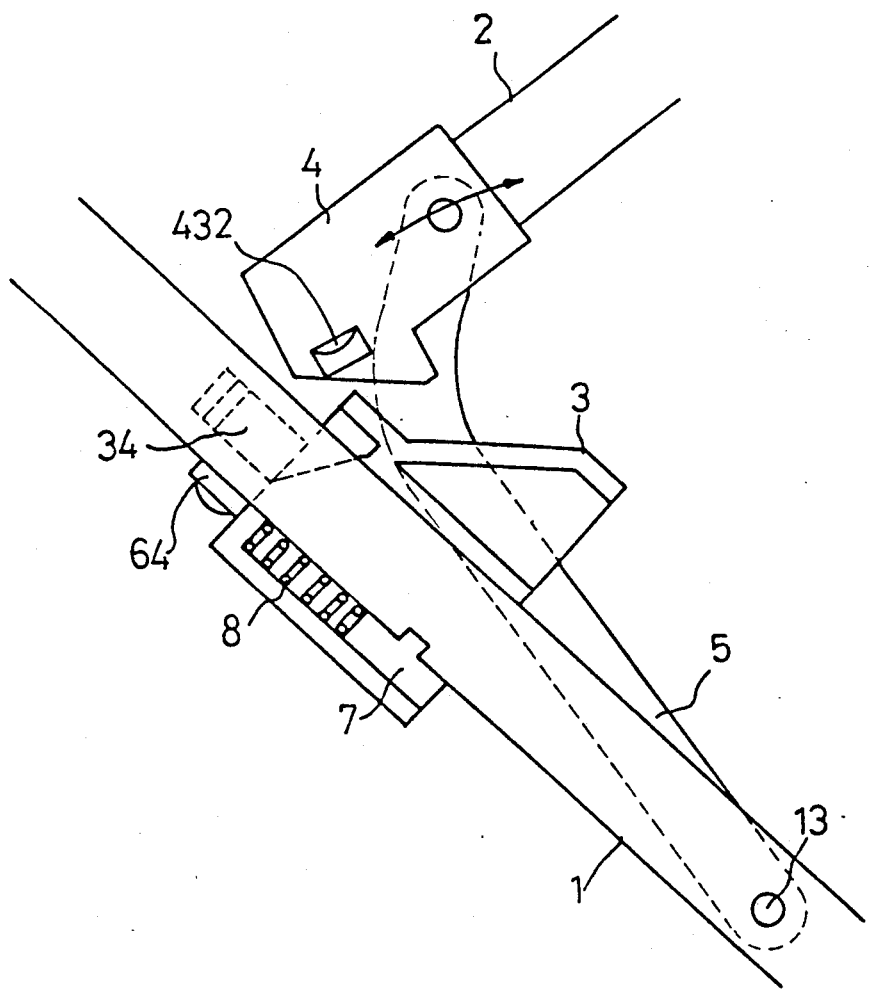
FIG. 6 shows the way to detach the engaging seat from the coupling block.
Figure 7:
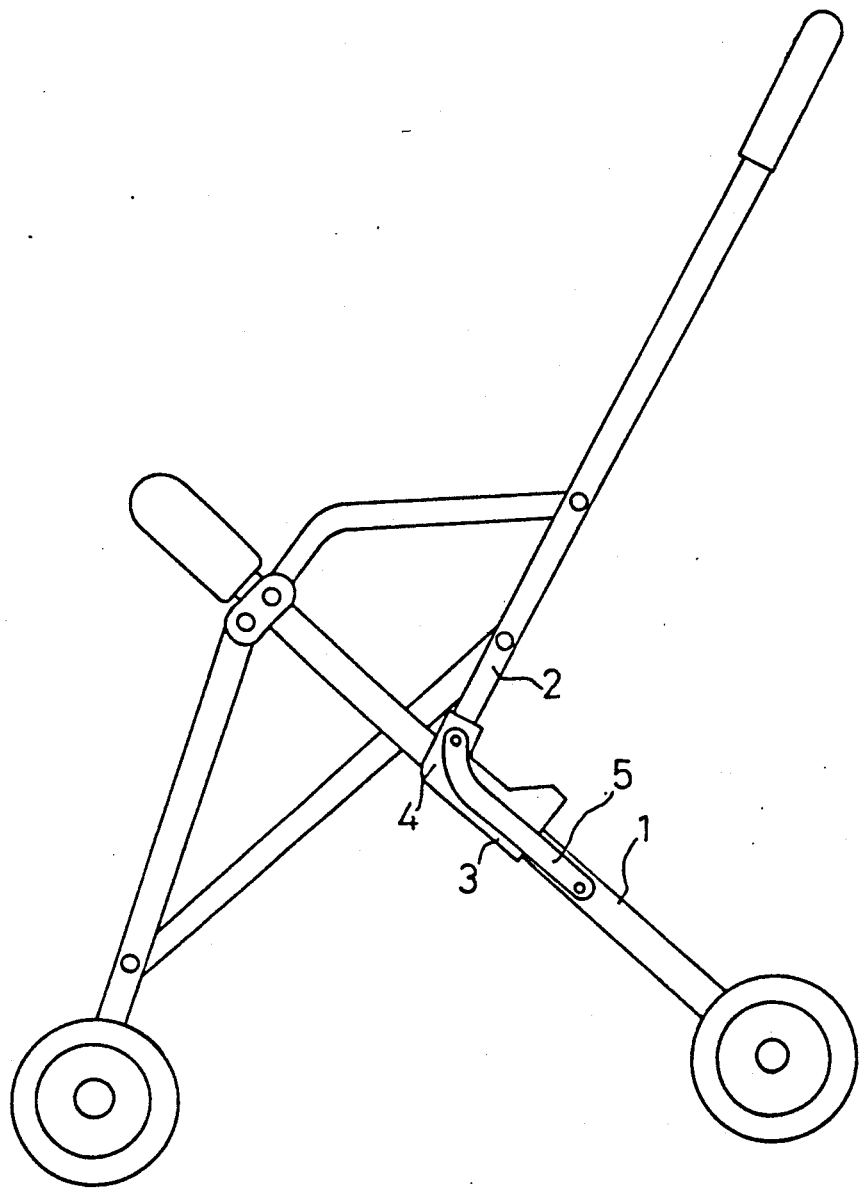
FIG. 7 shows the expanding state of the present invention.
Figure 8:
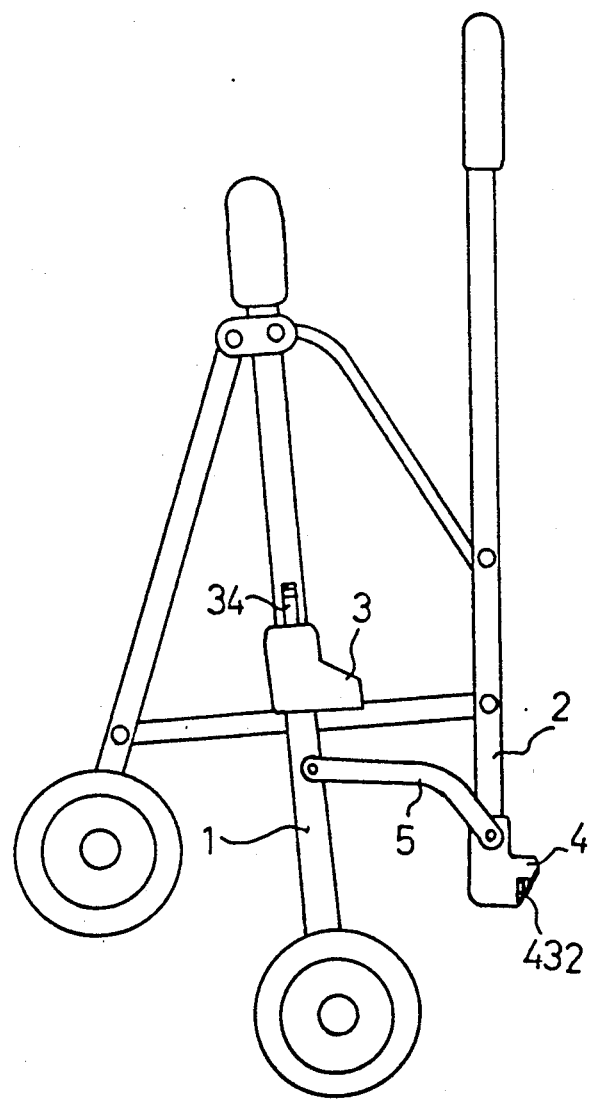
FIG. 8 shows the collapsed state of the present invention.
Figure 9:
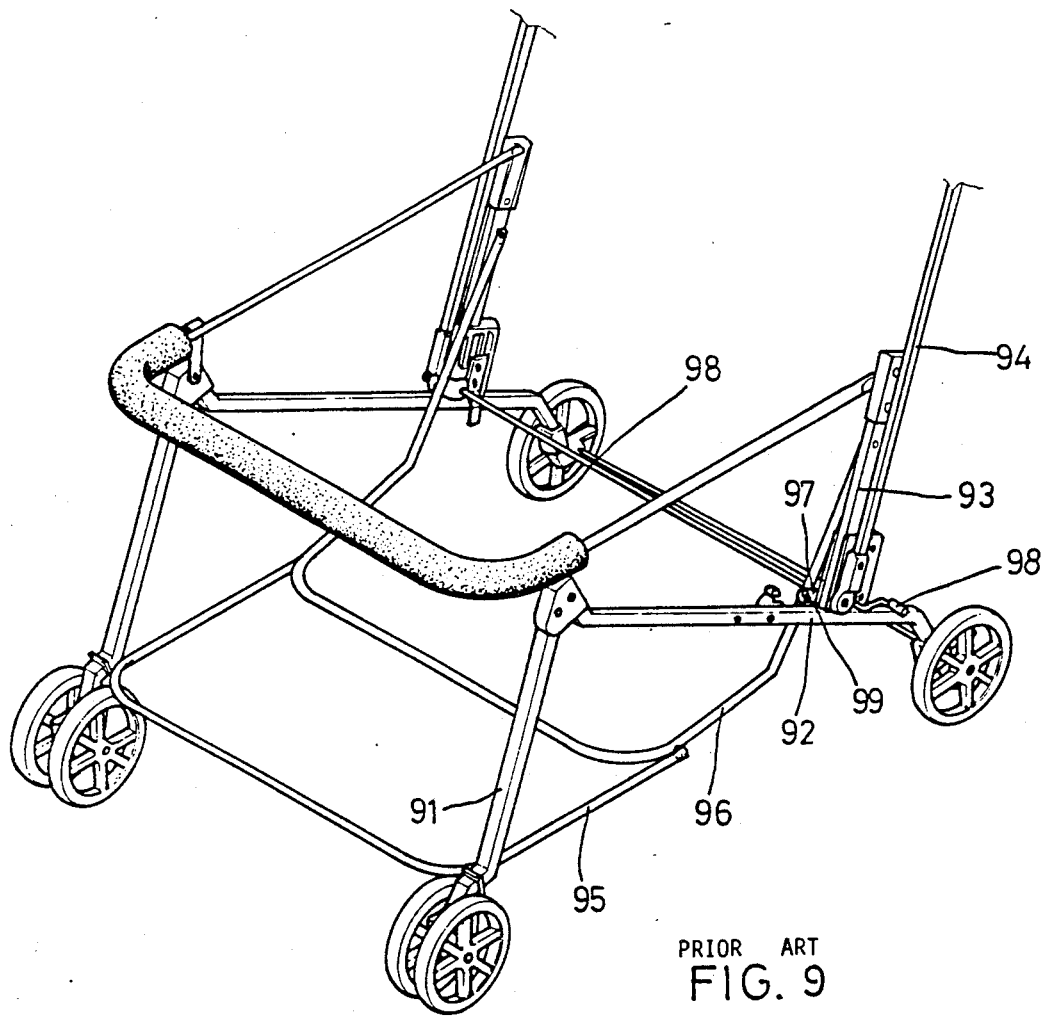
FIG. 9 shows the prior art collapsible mechanism.

When it is desired to fold up the stroller, the user simply presses the engaging seat 3 at both sides. With reference to FIGS. 5, 6 and 7, when the engaging seat 3 is pressed, the spring 8 is compressed thereby detaching the coupling block 4 from the recess 33 thereof. The engaging seat 3 is lowered to a position where the top of the lugs 34 is in contact with the bottom surface of the protuberance 432. By means of the crank arm 5, it is only necessary to pull the handle support 2 in order to collapse the stroller (see FIGS. 6 and 7). Meanwhile, the restoring force of the spring 8 will urge the engaging seat 3 to go upwards until it pushes against the washer 64. When it is desired to open the stroller, the user simply pushes the handle support 2 in an opposite direction urging the angular portion 43 of the coupling block 4 to press the engaging seat 3 downwards to compress the spring 8 until the angular portion 43 is completely received in the recess 33 of the engaging seat 3 (see FIG. 3).

Although the present invention has been described with a certain degree of particularity, it is understood that the present disclosure is made by way of example only and that numerous changes in the detail of construction and the combination and arrangement of part may be resorted to without departing from the spirit and scope of the invention as hereinafter claimed.

I claim:
1. The collapsible mechanism for a stroller with a handle support and a rear wheel support on each side of said stroller, comprising:
- an engaging seat member formed with a longitudinal passage extending therethrough for slidably receiving said rear wheel support two opposite lugs extending from a top of said seat member, and a recess formed in the top of said seat member, said longitudinal passage having a semi-cylindrical chamber at one side thereof;
- a coupling block having one end connected said handle support and an opposite end having a slot adapted to receive said rear wheel support, said opposite end including an angular portion adapted to be received within the recess of said engaging seat member, said angular portion of said coupling block having outer sidewalls with a protuberance provided on each of said outer sidewalls;
- a spring disposed within the semi-cylindrical chamber of said engaging seat;
- a stop member engaged with said rear wheel support and received within said semi-cylindrical chamber, said stop member having a top end in contact with a bottom end of said spring; and
- a crank arm having one end pivotally connected to said rear wheel support and an opposite end pivotally connected to said handle support.

* * * * *